United States Patent
Eickemeyer et al.

(10) Patent No.: US 8,347,068 B2
(45) Date of Patent: Jan. 1, 2013

(54) MULTI-MODE REGISTER RENAME MECHANISM THAT AUGMENTS LOGICAL REGISTERS BY SWITCHING A PHYSICAL REGISTER FROM THE REGISTER RENAME BUFFER WHEN SWITCHING BETWEEN IN-ORDER AND OUT-OF-ORDER INSTRUCTION PROCESSING IN A SIMULTANEOUS MULTI-THREADED MICROPROCESSOR

(75) Inventors: Richard James Eickemeyer, Rochester, MN (US); Hung Qui Le, Austin, TX (US); Dung Quoc Nguyen, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 11/696,363

(22) Filed: Apr. 4, 2007

(65) Prior Publication Data

US 2008/0250226 A1    Oct. 9, 2008

(51) Int. Cl.
G06F 9/30 (2006.01)
(52) U.S. Cl. ........................ 712/229; 712/217
(58) Field of Classification Search ................ 712/43, 712/217, 220, 229
See application file for complete search history.

(56) References Cited

U.S. PATENT DOCUMENTS

| | | | | |
|---|---|---|---|---|
| 6,003,126 | A * | 12/1999 | Huynh et al. | 712/217 |
| 6,092,175 | A * | 7/2000 | Levy et al. | 712/23 |
| 6,338,134 | B1 * | 1/2002 | Leung et al. | 712/217 |
| 6,954,846 | B2 * | 10/2005 | Leibholz et al. | 712/43 |
| 7,100,060 | B2 * | 8/2006 | Cai et al. | 713/320 |
| 2004/0268093 | A1 * | 12/2004 | Samra et al. | 712/217 |
| 2007/0186081 | A1 * | 8/2007 | Chaudhry et al. | 712/214 |

OTHER PUBLICATIONS

Chinese Office Action regarding Chinese Application No. 2008100918357, dated Jun. 26, 2009, 7 pages. (English-language Translation).
Chinese Office Action regarding Chinese Application No. 2008100918357, dated Jun. 26, 2009, 3 pages.
Response to Chinese Office Action regarding Chinese Application No. 2008100918357, dated Nov. 11, 2009, 26 pages.

* cited by examiner

*Primary Examiner* — David Huisman
(74) *Attorney, Agent, or Firm* — Yee & Associates, P.C.

(57) ABSTRACT

A multi-mode register rename mechanism which allows a simultaneous multi-threaded processor to support full out-of-order thread execution when the number of threads is low and in-order thread execution when the number of threads increases. Responsive to changing an execution mode of a processor to operate in in-order thread execution mode, the illustrative embodiments switch a physical register in the data processing system to an architected facility, thereby forming a switched physical register. When an instruction is issued to an execution unit, wherein the issued instruction comprises a thread bit, the thread bit is examined to determine if the instruction accesses an architected facility. If the issued instruction accesses an architected facility, the instruction is executed, and the results of the executed instruction are written to the switched physical register.

15 Claims, 6 Drawing Sheets

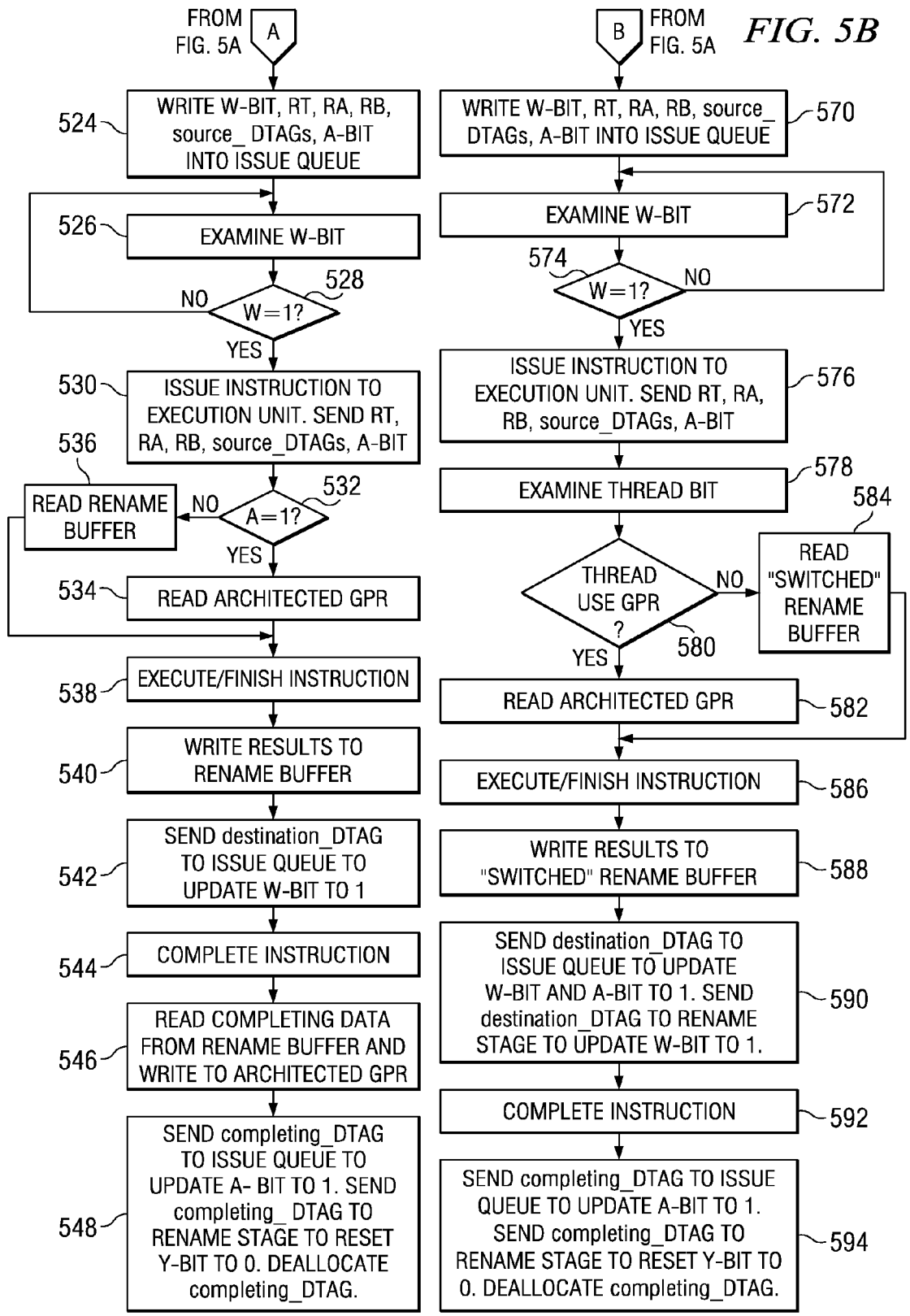

MULTI-MODE REGISTER RENAME MECHANISM THAT AUGMENTS LOGICAL REGISTERS BY SWITCHING A PHYSICAL REGISTER FROM THE REGISTER RENAME BUFFER WHEN SWITCHING BETWEEN IN-ORDER AND OUT-OF-ORDER INSTRUCTION PROCESSING IN A SIMULTANEOUS MULTI-THREADED MICROPROCESSOR

BACKGROUND

1. Field of the Invention

The present application relates generally to an improved data processing system, and in particular to a multi-mode register rename mechanism which allows a simultaneous multi-threaded processor to support full out-of-order thread execution when the number of threads is low and in-order thread execution when the number of threads increases.

2. Description of the Related Art

Multiple processor systems are generally known in the art. In a multiple processor system, a process may be shared by a plurality of processors. The process is broken up into threads which may be processed concurrently. The threads must be queued for each of the processors of the multiple processor system before they may be executed by a processor. Some processors are capable of processing multiple threads simultaneously. These processors are referred to as Simultaneous Multi-Threaded (SMT) processors. SMT provides significant increases in microprocessor throughput by issuing instructions from multiple threads per clock cycle. Instructions may be executed in-order or out-of-order. In-order execution is the ability to execute instructions in program order. For in-order execution mode, if a first instruction depends on the result of a second instruction, the processor cannot issue the first instruction until the processor knows the result of the second instruction. The processor then issues the second instruction after the processor issues the first instruction. Out-of-order execution is the ability to execute instructions not necessarily in program order, but rather as soon as an instruction's input operands are available to enable an increase in processor performance. For example, in out-of-order execution mode, the processor jumps to the next instruction that does not depend on the result of a previous instruction and issues this non-dependent instruction.

A common technique used when designing SMT processors is register renaming. Registers are temporary storage places which a central processing unit (CPU) uses to store the variables (values) of an instruction. Register renaming addresses the name dependencies which may occur in out-of-order execution mode, and avoids unnecessary serialization of program operations imposed by reuse of registers by those operations. For example, when two instructions use the same register, renaming the register for one of the instructions allows the two instructions to execute simultaneously or be reordered without conflict. Thus, register renaming changes the name of a register to the name of an available register, and then assigns data to the available register.

Thus, register renaming allows for increasing processor performance by allowing instructions to execute out-of-order. However, as the number of threads that may be executed in an SMT microprocessor increases, the performance gain due to out-of-order execution drops significantly. For instance, when the number of threads approaches 4-way SMT or 8-way SMT, most of the performance gain that may be achieved by increasing throughput using out-of-order execution is negated by the number of instructions issued from the other threads. Additional threads also require more architected registers, which in turn require more silicon overhead.

SUMMARY

The illustrative embodiments provide a multi-mode register rename mechanism which allows a simultaneous multi-threaded processor to support full out-of-order thread execution when the number of threads is low and in-order thread execution when the number of threads increases. Responsive to changing an execution mode of a processor to operate in in-order thread execution mode, the illustrative embodiments switch a physical register in the data processing system to an architected facility, thereby forming a switched physical register. When an instruction is issued to an execution unit, wherein the issued instruction comprises a thread bit, the thread bit is examined to determine if the instruction accesses an architected facility. If the issued instruction accesses an architected facility, the instruction is executed, and the results of the executed instruction are written to the switched physical register.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

FIGS. 5A and 5B illustrate a flowchart of a process for allowing a simultaneous multi-threaded processor to support full out-of-order thread execution and in-order thread execution with a multi-mode register rename mechanism in accordance with the illustrative embodiments.

DETAILED DESCRIPTION OF THE PREFERRED EMBODIMENT

The illustrative embodiments provide a register rename mechanism which allows a simultaneous multi-threaded processor to support full out-of-order thread execution when the number of threads is low, and in-order thread execution when the number of threads increases. In particular, the register renaming mechanism enables a register renaming facility (e.g., rename buffer) to switch from being a temporary storage facility when the processor is operating in full out-of-order thread execution mode, to being an architected facility (e.g., a general purpose register (GPR) file) when the processor is operating in in-order thread execution mode.

As previously mentioned, while existing register renaming techniques may increase processor performance by allowing instructions to execute out-of-order, the performance gain due to out-of-order execution drops significantly as the number of threads increases. The processor would require more physical registers to sustain a higher number of threads in out-of-order execution mode. Since there are limits to the performance advantage of operating in out-of-order mode, the processor may switch to operate in in-order execution mode. However, the processor would still require more architected registers to accommodate the increase in the number of threads. With the register renaming mechanism in the illustrative embodiments, a processor may operate in in-order execution mode to accommodate an increase in the number of threads and allow the physical registers (temporary storage) in the processor to operate as architected registers (permanent storage). Allowing a physical register to operate as an architected register represents a large savings in silicon and power consumption, since the processor does not need to add any new architected registers to support an increase in the number of threads. When the thread execution mode switches to in-order mode, dependent instructions must wait until the instructions' operands are available in the architected register before the instructions may be executed, since the rename buffer is no longer available to store temporary results.

Figure 1:
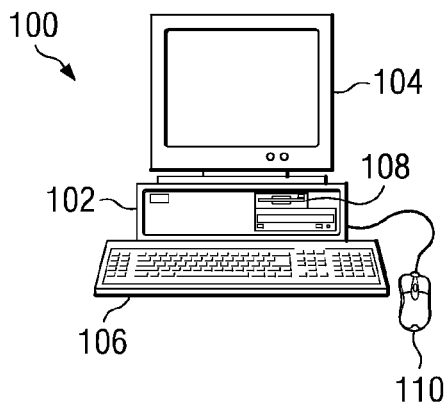
FIG. 1 is a pictorial representation of a data processing system in which the illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Figure 2:
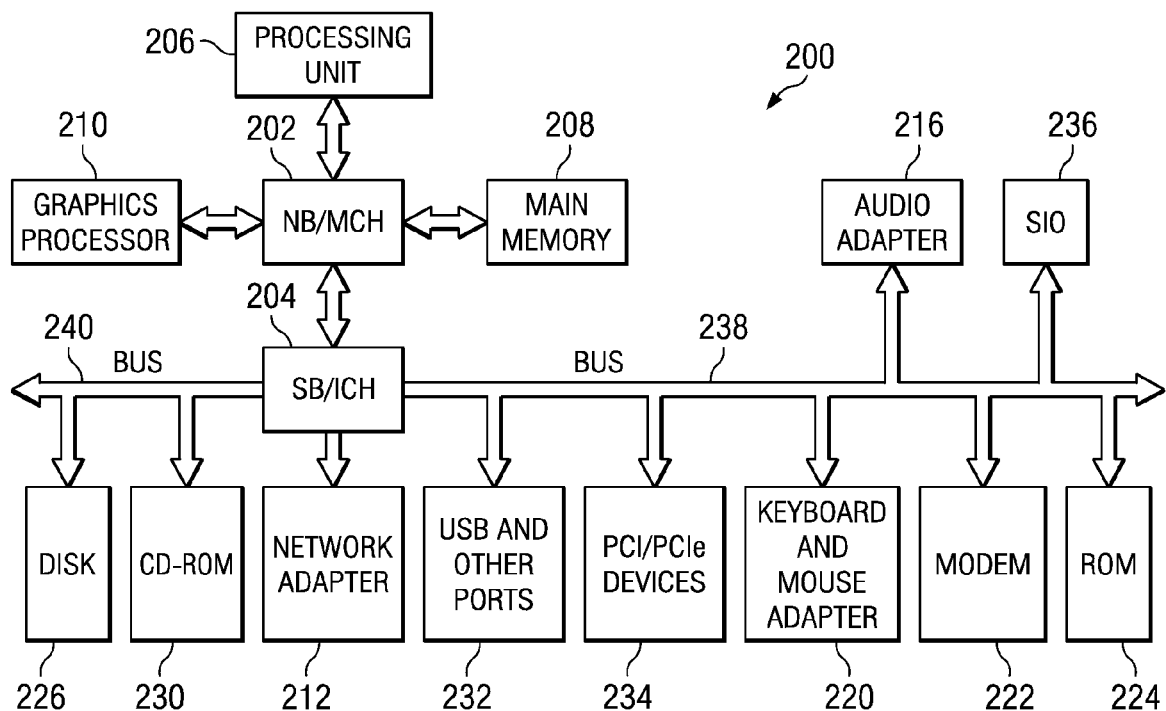
FIG. 2 is a block diagram of a data processing system in which the present invention may be implemented in accordance with the illustrative embodiments.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100. Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors, such as a dual or multi-SMT processors, and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Figure 3:
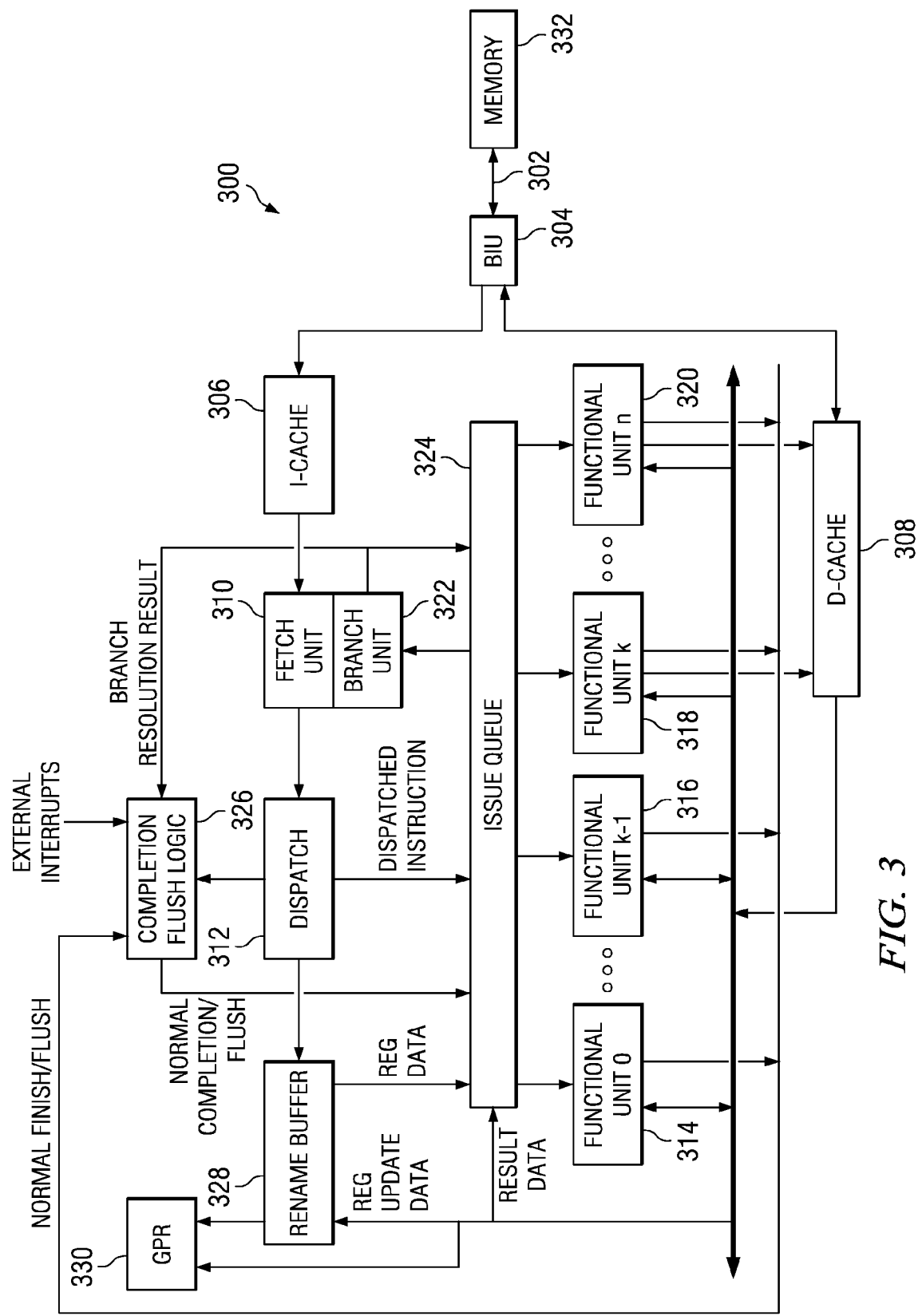
FIG. 3 is an exemplary diagram of a processor system in which the illustrative embodiments may be implemented.

FIG. 3 is an exemplary diagram of a processor system 300 in which illustrative embodiments may be implemented. In this illustrative embodiment, processor 300 is a single integrated circuit superscalar microprocessor, such as processor unit 206 in FIG. 2. Accordingly, as discussed further hereinbelow, processor 300 includes various units, registers, buffers, memories, and other sections, all of which are formed by integrated circuitry. System bus 302 connects to bus interface unit ("BIU") 304 of processor 300. BIU 304 controls the transfer of information between processor 300 and system bus 302.

BIU 304 connects to instruction cache (ICache) 306 and to data cache (DCache) 308 of processor 300. Instruction cache 306 outputs instructions to instruction fetch unit 310. In response to such instructions from instruction cache 306, instruction fetch unit 310 passes instructions to dispatch unit 312 which, in turn, decodes and outputs instructions to other execution circuitry of processor 300.

The execution circuitry of processor 300 includes multiple execution units, also referred to herein as functional units, and shown in the figure as functional units 314-320. These functional units include, for example, floating point, fixed point, and load/store units, which are conventional in the art.

Processor 300 also contains branch unit 322 which receives branch instructions from instruction fetch unit 310 and performs look-ahead operations on conditional branches to resolve them as soon as possible. Branch unit 322 predicts the direction of the conditional branch. Therefore, when an unresolved conditional branch instruction is encountered, processor 300 fetches instructions from the predicted target stream until the conditional branch is resolved.

Processor 300 also includes Issue Queue 324. Issue queue 324 holds instructions until all input data is available and the instructions can be issued to the functional units.

Completion/flush logic 326 retires executed instructions. Completion/flush logic 326 recognizes exception conditions and discards any operations being performed on subsequent instructions in program order. Moreover, in the event of a mispredicted branch, completion/flush logic 326 flushes instructions which are in various stages of being processed by the processor 300 and allows dispatch unit 312 to begin dispatching from the correct path. Completion/flush logic 326 also receives a signal indicating the receipt of external interrupts which can affect program flow through the processor 300.

Rename buffer 328 provides the physical registers for temporarily storing instruction results and operands. Rename buffer 328 receives result data from functional units 314-320 and outputs register data to Issue Queue 324.

General purpose register (GPR) file 330 provides the architected registers for permanently storing instruction results and operands. GPR file 330 receives result data from functional units 314-320 and outputs register data to Issue Queue 324.

Processor 300 achieves high performance by processing multiple instructions simultaneously at various ones of functional units 314-320. Accordingly, processor 300 processes each instruction as a sequence of stages, each being executable in parallel with stages of other instructions. The technique of implementing a sequence of stages is known as "pipelining" and is conventional in the art. Processor 300 normally processes an instruction in stages such as, for example, fetch, decode, dispatch, issue, execute, and completion.

In the fetch stage, instruction fetch unit 310 inputs from instruction cache 306 one or more instructions from one or more memory addresses in memory 332 which store the sequence of instructions.

In the dispatch stage, dispatch unit 312 selectively dispatches instructions to Issue Queue 324 after reserving rename buffer entries or general purpose register entries for the results of the dispatched instructions (destination operands). In the dispatch stage, processor 300 supplies operand information to Issue Queue 324 for the dispatched instructions. Processor 300 dispatches instructions in program order. In the issue stage, processor 300 issues instructions with available data from Issue Queue 324 to selected functional units 314320.

In the execute stage, functional units 314-320 execute their issued instructions and output results of their operations for storage at selected entries in rename buffer 328 if the processor is operating in out-of-order execution mode. In this manner, processor 300 is able to execute instructions out-of-order relative to their programmed sequence. If the processor is operating in in-order execution mode, the functional units 314-320 output results of their operations for storage at selected entries in GPR 330. After executing an instruction, the functional unit signals completion/flush logic 326 that the instruction has executed.

In the completion stage, completion/flush logic 326 determines if instructions have been executed and then processes the oldest instruction first. Processor 300 "completes" instructions in order of their programmed sequence.

Figure 4:
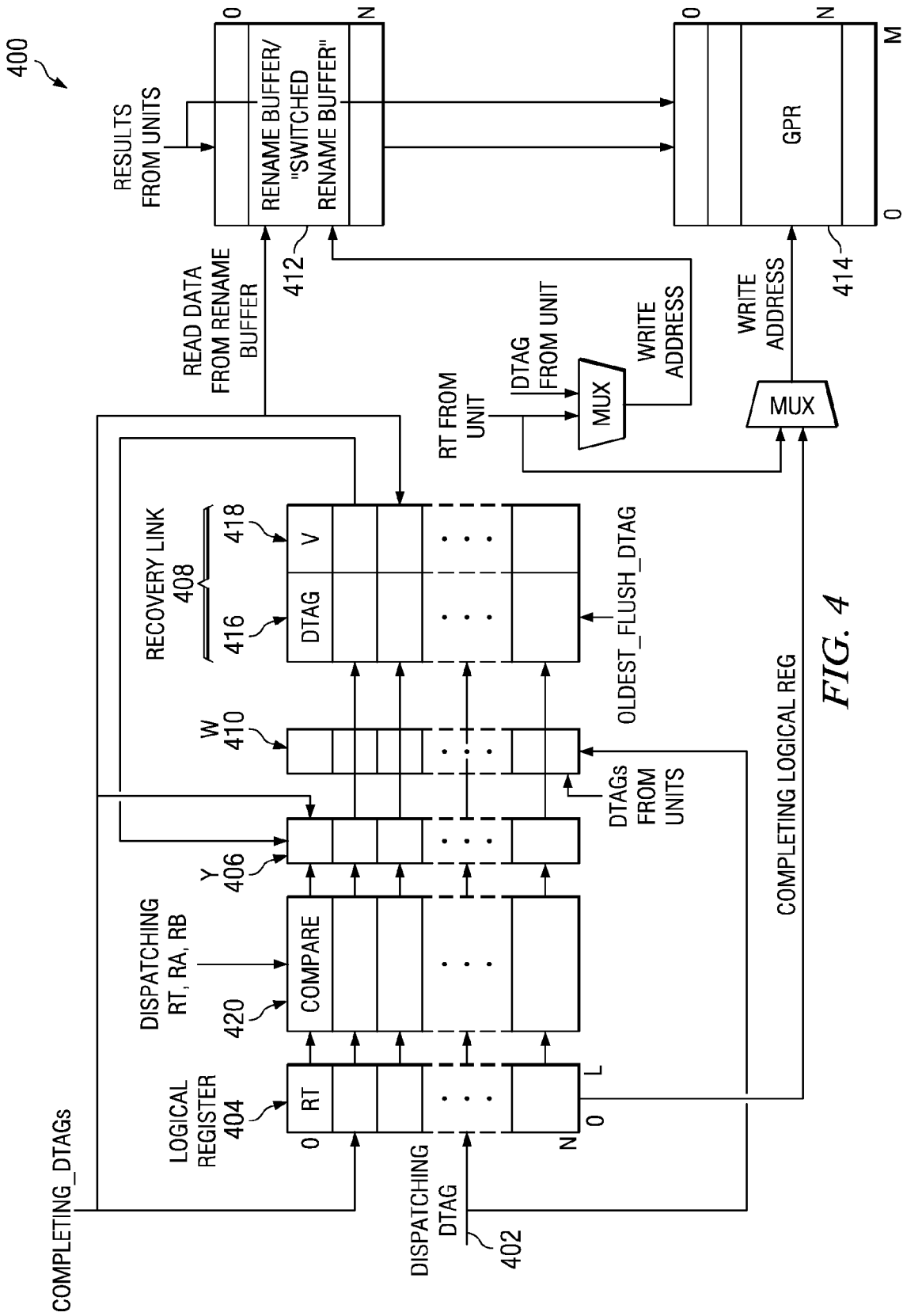
FIG. 4 is an exemplary diagram illustrating the multi-mode register renaming technique in accordance with the illustrative embodiments.

FIG. 4 is an exemplary diagram illustrating the multi-mode register renaming system in accordance with the illustrative embodiments. Register renaming system 400 may be implemented in processor system 300 in FIG. 3. In this illustrative example, multi-mode register renaming system 400 includes dispatching DTAG (destination TAG) 402, logical_register 404, Y-bit 406, recovery_link 408, W-bit 410, rename buffer/ "switched rename buffer" 412, and general purpose register (GPR) file 414. It should be noted that while general purpose register (GPR) 414 file renaming is specifically described for purposes of illustration, the multi-mode register renaming process in the illustrative embodiments is applicable to any other type of architected facilities, including a floating point register (FPRs) file.

Dispatching DTAG 402 is a tag which specifies the association between a logical register indicated in the dispatching instruction and a renamed register (physical register) to which the dispatching instruction may write the result of its operation. Multi-mode register renaming system 400 allocates dispatching DTAG 402 sequentially at instruction dispatch time, and deallocates the completed dispatching DTAG 402 sequentially at completion time.

Logical_register 404 is an array specifying the architected destination register (RT) location of an instruction. Multi-mode register renaming system 400 uses the destination register (RT) location of each instruction in logical_register 404 as a write address into the architected registers, such as GPR 414.

Y-bit 406 is a bit which indicates the DTAG of the youngest instruction with which to update a particular destination register (RT) field in GPR 414. When there are multiple instructions which need to update the same destination register (RT)

field in GPR 414, only the youngest instruction may have Y-bit 406 equal to 1. When Y-bit 406 of the youngest instruction is 1, the dependent instructions will wait for the particular DTAG of the youngest instruction to execute and will ignore all other instructions with Y-bit 406 equal to 0.

Recovery_link 408 is an array which contains DTAG 416 of a previously dispatched instruction that is updating the same destination register (RT) as the dispatching instruction and the DTAG's corresponding V-bit 418. Multi-mode register renaming system 400 uses recovery_link 408 array to restore Y-bit 406 at flush time to the previous un-flushed DTAG (e.g., the dispatching DTAG 402 that is updating the same destination register (RT) field as the flushed instruction).

V-bit 418 is a bit which indicates that DTAG 416 entry in recovery_link 408 is valid. In other words, when V-bit 418 for DTAG 416 entry is set to 1, the V-bit indicates that this DTAG of a previously dispatched instruction that is updating the same destination register (RT) as the dispatching instruction is still in the renamed state.

W-bit 410 is a bit which indicates whether the result of an instruction has been written to the destination register (RT) in the DTAG. When the processor is operating in full out-of-order execution mode, if W-bit 410 equals 0, the result of the instruction is not yet written into rename buffer 412. Conversely, if W-bit 410 equals 1, the result of the instruction is already written in "switched rename buffer" 412. When the processor is operating in in-order execution mode, if W-bit 410 equals 0, the result of the instruction is not yet written into the architected register. Conversely, if W-bit 410 equals 1, the result of the instruction is already written in the architected register (i.e., either GPR 414 or "switched rename buffer" 412).

Rename buffer/"switched rename buffer" 412 is a register file. When the processor is operating in full out-of-order execution mode, rename buffer 412 holds temporary results of the instruction before the results may be committed into the architected facility upon completion of the instruction. There is usually one rename buffer entry per DTAG. When the processor is operating in full in-order execution mode, rename buffer 412 is switched to an architected register "switched rename buffer" 412 in order to hold architected results of the instruction.

The processor manages the structure of multi-mode register renaming system 400 by allocating and deallocating DTAGs based on a DTAG_head_pointer and a DTAG_tail_pointer. This DTAG allocation/deallocation management process is conventional in the art. The DTAG_head_pointer points to the next free DTAG to be allocated to a dispatching instruction, while the DTAG_tail_pointer points to the oldest uncompleted DTAG. The processor allocates DTAGs sequentially at dispatch time and deallocates DTAGs at completion time. The number of free DTAGs may be determined by examining the states of DTAG_head_pointer and DTAG_tail_pointer.

DTAG head/tail pointer management logic manages the renaming structure at dispatch time by determining how many DTAGs are available to assign to dispatching instructions. If all DTAGs are already allocated to instructions, then dispatch must stop and wait for DTAGs to free up and become available. If there are free DTAGs to be allocated, then the processor allocates DTAGs to the dispatching instruction (the newly allocated DTAGs may be obtained from the DTAG_head_pointer+N, where N is a value starting from 0). After allocating the DTAGs to dispatching instructions, the processor advances the DTAG_head_pointer to the next free DTAG.

DTAG head/tail pointer management logic manages the renaming structure at flush time by flushing out any DTAG equal or younger than the flush_DTAG. For instance, the DTAG_head_pointer moves back to the oldest un-flushed DTAG+1 position (i.e., the DTAG_head_pointer moves back to the next free DTAG to be allocated). The flush_DTAG is sent to the head/tail pointer management logic. The flush_DTAG then replaces the current DTAG_head_pointer as the new DTAG_head_pointer.

DTAG head/tail pointer management logic manages the renaming structure at completion time by moving the DTAG_tail_pointer forward to deallocated completing DTAGs. DTAG head/tail pointer management logic obtains the count of completing DTAGs. The DTAG_tail_pointer logic moves forward (i.e., deallocates) based on the count of completing DTAGs. For example, if four DTAGs are completed, then the DTAG_tail_pointer will move forward four slots to deallocate these four DTAGs.

For 2-way simultaneous multi-threading (SMT), the DTAGs may be partitioned such that a contiguous half of the DTAGs may be allocated to one thread, while the other contiguous half may be allocated to the other thread. For example, if the DTAG field ranged from 0 to 63, then DTAGs 0 to 31 may be assigned to thread0, while DTAGs 32 to 63 may be assigned to thread1.

The register rename operation may begin with the initial rename states (i.e., when the processor is powered on) of the destination register (RT) fields in logical_register 404 array set to 0. In addition, all Y-bits 406, all W-bits 410, and all V-bits 418 in recovery_link 408 array are also set to 0.

At instruction dispatch time, the register rename operation allocates a DTAG (dispatching DTAG 402) for an instruction that is updating a location in a logical register such as GPR 414. The register rename operation uses the allocated dispatching DTAG 402 to write the destination register (RT) of the dispatching instruction into the destination register (RT) field of logical_register 404 array. The register rename operation also sets the Y-bit 406 for the dispatching DTAG 402 to 1, and the W-bit 410 for the dispatching DTAG 402 to 0. Writing the destination register (RT) into logical_register 404 indicates that the destination register (RT) is assigned to this particular DTAG 402. Setting W-bit 410 to 0 indicates that the result of the instruction is not yet written into rename buffer 412. Setting Y-bit 406 to 1 indicates that this instruction is the youngest instruction updating the specified destination (RT) location.

The register rename operation compares 420 the dispatching destination register (RT) specified in the dispatching instruction against all entries (which contain previously dispatched destination registers) in logical_register 404 array. Responsive to finding one or more matches between the dispatching destination register (RT) and the entries in logical_register 404 array, the register rename operation selects the particular matching entry in logical_register 404 array where the Y-bit 406 is 1. The register rename operation then saves the DTAG associated with the particular matching entry in logical_register 404 array (e.g., previously dispatched DTAG 416) into recovery_link 408 array at the location pointed by dispatching DTAG 402. V-bit 418 at this location in recovery_link 408 array is also set to 1 to indicate that DTAG 416 saved in this location is still in the rename state. Thus, newly dispatching DTAG 402 will carry a link to the previously dispatched DTAG 416 that is updating the same destination register (RT) location. Also, the register rename operation resets Y-bit 406 to 0 at the matched location to indicate that previously dispatched DTAG 416 at the matched location is no longer the youngest instruction updating this destination register (RT).

The register rename operation also compares 420 each dispatching source register (RA, RB) specified in the dispatching instruction against all entries (which also contain previously dispatched source registers) in logical_register 404 array. Responsive to finding a match between the dispatching source registers (RA, RB) and the entries in logical_register 404 array where the Y-bit 406 is 1, the register rename operation then encodes the results of each match to form a source_TAG and sends the source_TAGs to the Issue Queue, such as Issue Queue 324 in FIG. 3. The source_TAG is the DTAG of the older instruction on which the source register (RA, RB) depends. It should be noted that each source register (RA, RB) should have only one matched compare, since there is only one destination register (RT) field where having the Y-bit 406 equal to 1. Thus, the remainder of the compares will not match. In the situation where either source register (RA, RB) compare does not result in a match, the register renaming operation may OR the compare results together to form a no-hit bit equal to 1 to indicate that this particular RA or RB is not dependent on an older instruction for its operand(s).

At this point, the register renaming operation then sends the instruction, along with the logical destination register (RT), source registers (RA, RB), dispatching DTAG, source_TAG, W-bit, and the no-hit indication to the Issue Queue.

At instruction issue time, the register rename operation will indicate whether the instruction is ready to be issued. An A-bit is a bit in the Issue Queue which indicates the location of the instruction result. For example, if an A-bit is equal to 1, the result of the instruction is in the architected register, such as GPR 414. In such a case, the instruction will read the architected register for its operand. If the A-bit is equal to 0, the instruction will read its operand from rename buffer 412 in full out-of-order execution mode. For example, if the no-hit indicator from the register rename operation is equal to 1, the register rename operation sets an A-bit in the Issue Queue and the W-bit in the Issue Queue to 1, since the no-hit indicator indicates that the instruction does not depend on any older instruction, and the A-bit and W-bit indicate that the operand may be obtained from the architected register. In contrast, if the no-hit indicator from the register rename operation is equal to 0, the register rename operation sets the A-bit to 0 and writes the value of the W-bit obtained from the rename stage into the Issue Queue if the processor is operating in full out-of-order mode. If the processor is operating in in-order mode, the register rename operation writes the value of the W-bit obtained from the rename stage into the Issue Queue, and also sets the A-bit to 1 if the obtained W-bit from the rename stage is equal to 1.

When an instruction is ready to be issued, the Issue Queue sends the issuing instruction, along with the logical destination register (RT), source registers (RA, RB), dispatching DTAG, source_TAG, and A-bits, to an execution unit, such as functional units 314-320 in FIG. 3. If the processor is in full out-or-order mode, the execution unit reads the operand from rename buffer 412 using the source_TAG (physical pointer) as the read address if the A-bit is 0, or alternatively reads the operand from the architected GPR 414 using the source register (RA, RB) fields (logical pointer) as the read address if the A-bit is 1. If the processor is in in-order mode, the execution unit reads the operand from the architected register using the source register (RA, RB) fields (logical pointer). The execution unit may read either the original architected GPR 414 or the "switched rename buffer" 412 for its architected data depending upon the thread. For instance, at issue time, a thread indicator is issued along with the instruction. If the thread indicator is pointing to the original architected GPR 414, then the execution unit reads the original architected GPR 414. The thread indicator may be arbitrarily assigned to either the original architected GPR or the "switched rename buffer".

At instruction finish time (i.e., when the instruction has passed the flush point), the execution units sends back the DTAG (execution_DTAG) to the Issue Queue and the rename stage. The Issue Queue compares the source_DTAG with the execution_DTAG. If a match is found, the register rename operation sets the W-bit to 1 when the processor is operating in full out-of-order mode to indicate that this operand may now read data from rename buffer 412. If the processor is operating in in-order mode, the register rename operation sets the W-bit to 1 and the A-bit to 1 to indicate that this operand may now read data from the "switched rename buffer" 412 or from GPR 414, depending on the thread.

At the rename stage, the register rename operation sets W-bit 410 to 1 at the location pointed to by the execution_DTAG. When W-bit 410 is 1, any younger instruction that is depending on this destination register (RT) can read its operand from rename buffer 412 if the processor is operating in full out-of-order mode. When W-bit 410 is 1, any younger dependent instruction will read its operand from the "switched rename buffer" 412 or from GPR 414, depending on the thread, if the processor is operating in in-order mode.

At the writeback stage, if the processor is operating in full out-of-order mode, the register rename operation writes the execution result of the instruction into rename buffer 412 using the execution_DTAG (physical pointer) as the address. If the processor is operating in in-order mode, the writeback data must wait until it can pass the point of flushing before the register rename operation may write the writeback data into the architected register. Depending on which thread is producing the result, the writeback data will be written into either GPR 414 or "switched rename buffer" 412 using the execution destination register (RT) field (logical pointer) as the write address.

At instruction completion time, the completion logic sends the completing_DTAG to the Issue Queue and the rename stage. The Issue Queue compares the source_DTAG with the completing_DTAG. If a match is found, the register rename operation sets the A-bit to 1 when the processor is operating in full out-of-order mode to indicate that this operand may now read data from the architected register (i.e. GPR 414). If the processor is operating in in-order mode, the A-bit is already set at finish time, thus no further action is required.

At the rename stage, the register rename operation resets Y-bit 406 to 0 at the location pointed to by the completing_DTAG. The register rename operation also uses the completing_DTAGs to compare with all the DTAGs contained in recovery_link 408. At matched locations in recovery_link 408, the register rename operation resets the V-bits 418 to 0 to indicate that these locations are completed. If the processor is operating in full out-of-order mode, the register rename operation uses the completing_DTAG to read the completing_RT fields from logical_register 404 array. The register rename operation then uses the completing_DTAG to read out the result from rename buffer 412 and write the result to GPR 414 using the completing_RT field as the GPR write address. The register renaming operation then deallocates the completed DTAG to be re-used by a new dispatching instruction.

At instruction flush time, the completion logic sends an oldest_flush_DTAG to the rename stage to restore the Y-bits to the proper states. Any DTAG which is equal to or younger than the oldest_flush_DTAG will be flushed out. These DTAGs at the flushed entries are called restore_DTAGs. DTAGs from all flushed entries must be read out and restored prior to dispatching of the new instruction stream. To flush an entry in recovery_link 408, the register rename operation may generate a flush_DTAG_vector using the DTAG_head_pointer and the oldest_flush_DTAG coming from the completion logic. Any DTAG with a V-bit 418 set to 1 in recovery_link 408 that is equal or younger than the oldest_flush_DTAG will be considered as a flushed entry (i.e., any entries between the DTAG_head_pointer and the oldest_flush_DTAG, including the oldest flush_DTAG, are to be flushed out).

To implement the restoring of the Y-bits to the proper states, the register renaming operation first performs a bit-wise AND of the V-bit to the associated bit from the flush_DTAG_vector for each entry in recovery_link 408 to indicate that this entry is being flushed and the content should be read out. The register renaming operation then reads the content for each recovery_link 408 entry by decoding DTAG 416 in recovery_link 408 to form a hot "1" vector. The hot "1" vector is ANDed with the result of the bit-wise AND to form the restore_DTAG for each entry. The register renaming operation uses the restore_DTAGs for each entry as write addresses to the Y-bit vector to set the Y-bits at the restoring location to 1.

When the Y-bits for all entries in recovery_link 408 are restored, the register renaming operation performs a bit-wise AND between the Y-bits (in the newly restored Y-bit vector) with the flush_DTAG_vector to clear out any Y-bits of the flushed instructions that were previously restored. At the matched location(s), the register renaming operation resets the Y-bit(s) to 0. Performing this bit-wise AND step prevents multiple Y-bits to be set to 1 for the same logical RT register (i.e., if the restore_DTAG is pointing to a flushed entry, then the Y-bit for that entry must be reset to 0 instead of set to 1). The restoring process above ensures that newly dispatching instructions after the flush will know on which destination register (RT) is the youngest from which to depend.

Figure 5A:
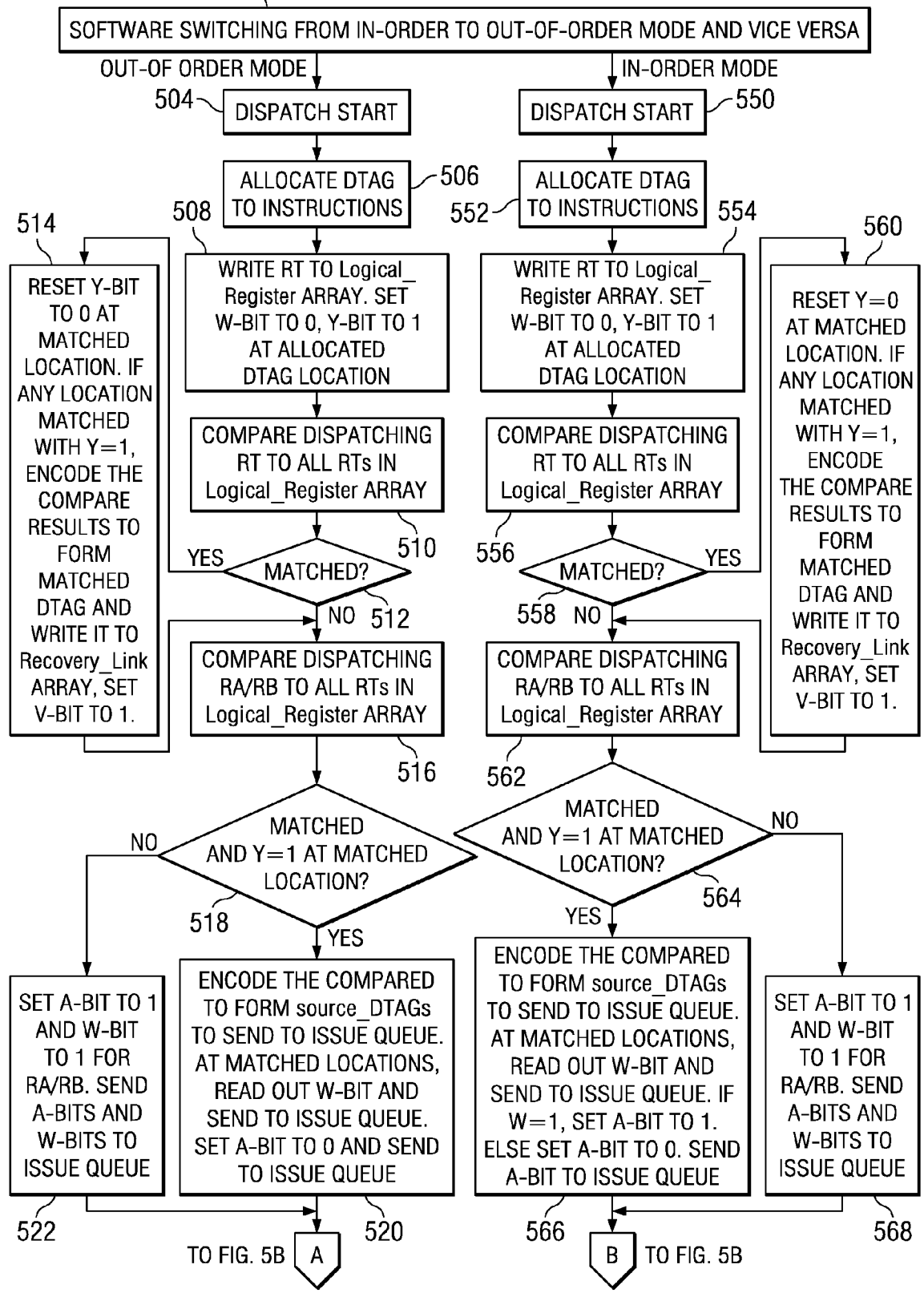

FIGS. 5A and 5B illustrate a flowchart of a process for allowing a simultaneous multi-threaded processor to support full out-of-order thread execution and in-order thread execution with a multi-mode register rename system in accordance with the illustrative embodiments. The process described in FIGS. 5A and 5B comprises both in-order and out-of-order thread execution, wherein the particular execution method utilized by the processor is selected by the processing software.

The process begins with the software selecting from one of an in-order thread processing mode or an out-of-order thread processing mode (step 502). If the software has switched to out-of-order mode, the register renaming system begins dispatching instructions to the Issue Queue (step 504) and allocates a dispatching DTAG for each instruction (step 506). The register renaming system writes the destination register (RT) of the instruction to the logical_register array and sets the W-bit to 0 and the Y-bit to 1 at the allocated DTAG location (step 508). The register renaming system compares the dispatching destination register (RT) to all other destination registers (RTs) in the logical_register array (step 510), and determines if there is a match (step 512). If no matching destination register exists ('no' output of step 512), the process then skips to step 516. For a matching destination register ('yes' output of step 512), the Y-bit at that matched location is reset to 0 to indicate that the previously dispatched DTAG at the matched location is no longer the youngest instruction updating the destination register, the Y-bit at the matched location of the matching dispatching destination register is set to 1 to indicate that this is now the youngest instruction updating the destination register, and the V-bit at matched location in the recovery_link array is also set to 1 to indicate that the DTAG saved in this location is still in the rename state (step 514).

The register renaming system compares the dispatching source registers (RA, RB) specified in the dispatching instruction to all other destination registers (RTs) in the logical_register array (step 516), and determines if there is a match (step 518). If a matching destination register is found and the Y-bit at the matched location is 1 ('yes' output of step 518), the register renaming system encodes the compares to form source_DTAGs, reads out the W-bit at the matched locations, and sets the A-bit to 0, and sends all of this information to the Issue Queue (step 520). If no matching destination register is found ('no' output of step 518), the register renaming system sets the A-bit to 1 and the W-bit to 1 for the source registers (RA, RB) and sends these bits to the Issue Queue (step 522).

At this point, the processes from steps 520 and 522 converge. The register renaming system writes the W-bit, the destination register (RT), and source registers (RA, RB), the source_DTAGs, and the A-bit to the Issue Queue (step 524). The Issue Queue examines the W-bit (step 526) and determines if the W-bit is equal to 1 (step 528). If the W-bit is not 1 ('no' output of step 528), the process loops back to step 526. If the W-bit is 1 ('yes' output of step 528), the Issue Queue issues the instructions to the execution units, including the destination register (RT), and source registers (RA, RB), the source_DTAGs, and the A-bit (step 530).

The execution units then determine if the A-bit provided with the instruction is equal to 1 (step 532). If the A-bit is 1 ('yes' output of step 532), the execution units read the architected general purpose register for operand information to process the instructions (step 534). If the A-bit is not 1 ('no' output of step 532), then the execution units read the rename buffer for operand information to process the instructions (step 536).

Once the execution units read the operands from either the general purpose register or rename buffer, the execution units execute and finish the instructions (step 538). The results of executing the instructions are written to the rename buffer (step 540). The destination_DTAG is sent to the Issue Queue and the rename stage to update the W-bit to 1 (step 542). When the instruction is completed (step 544), the register rename system reads the completing data from the rename buffer and writes the data to the architected general purpose register (step 546). The register rename system then sends a completing_DTAG to the Issue Queue to update the A-bit to 1, sends a completing_DTAG to the rename stage to reset the Y-bit to 0, and deallocate the completing_DTAG (step 548), with the process terminating thereafter.

Turning back to step 502, if the software has switched to in-order mode, the register renaming system begins dispatching instructions to the Issue Queue (step 550) and allocates a dispatching DTAG for each instruction (step 552). The register renaming system writes the destination register (RT) of the instruction to the logical_register array and sets the W-bit to 0 and the Y-bit to 1 at the allocated DTAG location (step 554). The register renaming system compares the dispatching destination register (RT) to all other destination registers (RTs) in the logical_register array (step 556), and determines if there is a match (step 558). For a matching destination register ('yes' output of step 558), the Y-bit at that matched location is reset to 0 to indicate that the previously dispatched DTAG at the matched location is no longer the youngest instruction updating the destination register, the Y-bit at the matched location of the matching dispatching destination register is set to 1 to indicate that this is now the youngest instruction updating the destination register, and the V-bit at matched location in the recovery_link array is also set to 1 to indicate that the DTAG saved in this location is still in the rename state (step 560). The process then continues to step 562.

Turning back to step 558, if no matching destination register exists ('no' output of step 558), the register renaming system compares the dispatching source registers (RA, RB) specified in the dispatching instruction to all other destination registers (RTs) in the logical_register array (step 562), and determines if there is a match (step 564). If a matching destination register is found and the Y-bit at the matched location is 1 ('yes' output of step 564), the register renaming system encodes the compares to form source_DTAGs, reads out the W-bit at the matched locations, sets the A-bit to 1 if the W-bit is equal to 1 (otherwise sets the A-bit to 0), and sends the A-bit to the Issue Queue (step 566). If no matching destination register is found ('no' output of step 564), the register renaming system sets the A-bit to 1 and the W-bit to 1 for the source registers (RA, RB) and sends these bits to the Issue Queue (step 568).

At this point, the processes from steps 566 and 568 converge. The register renaming system writes the W-bit, the destination register (RT), and source registers (RA, RB), the source_DTAGs, and the A-bit to the Issue Queue (step 570). The Issue Queue examines the W-bit (step 572) and determines if the W-bit is equal to 1 (step 574). If the W-bit is not 1 ('no' output of step 574), the process loops back to step 572. If the W-bit is 1 ('yes' output of step 574), Issue Queue issues the instructions to the execution units, including the destination register (RT), and source registers (RA, RB), the source_DTAGs, and the A-bit (step 576).

The execution units then examine the thread bit (step 578), and determine if the thread uses the architected general purpose register (step 580). If the thread uses the GPR ('yes' output of step 580), the execution units read the architected general purpose register for operand information to process the instructions (step 582). If the thread does not use the GPR ('no' output of step 580), then the execution units read the "switched" rename buffer for operand information to process the instructions (step 584).

Once the execution units read the operands from either the general purpose register or "switched" rename buffer, the execution units execute and finish the instructions (step 586). The results of executing the instructions are written to the "switched" rename buffer (step 588). The destination_DTAG is sent to the Issue Queue to update the W-bit to 1 and the A-bit to 1, and sent to the rename stage to update the W-bit to 1 (step 590). When the instruction is completed (step 592), the register rename system sends a completing_DTAG to the Issue Queue to update the A-bit to 1, sends a completing_DTAG to the rename stage to reset the Y-bit to 0, and deallocate the completing_DTAG (step 594), with the process terminating thereafter.

Figure 6:
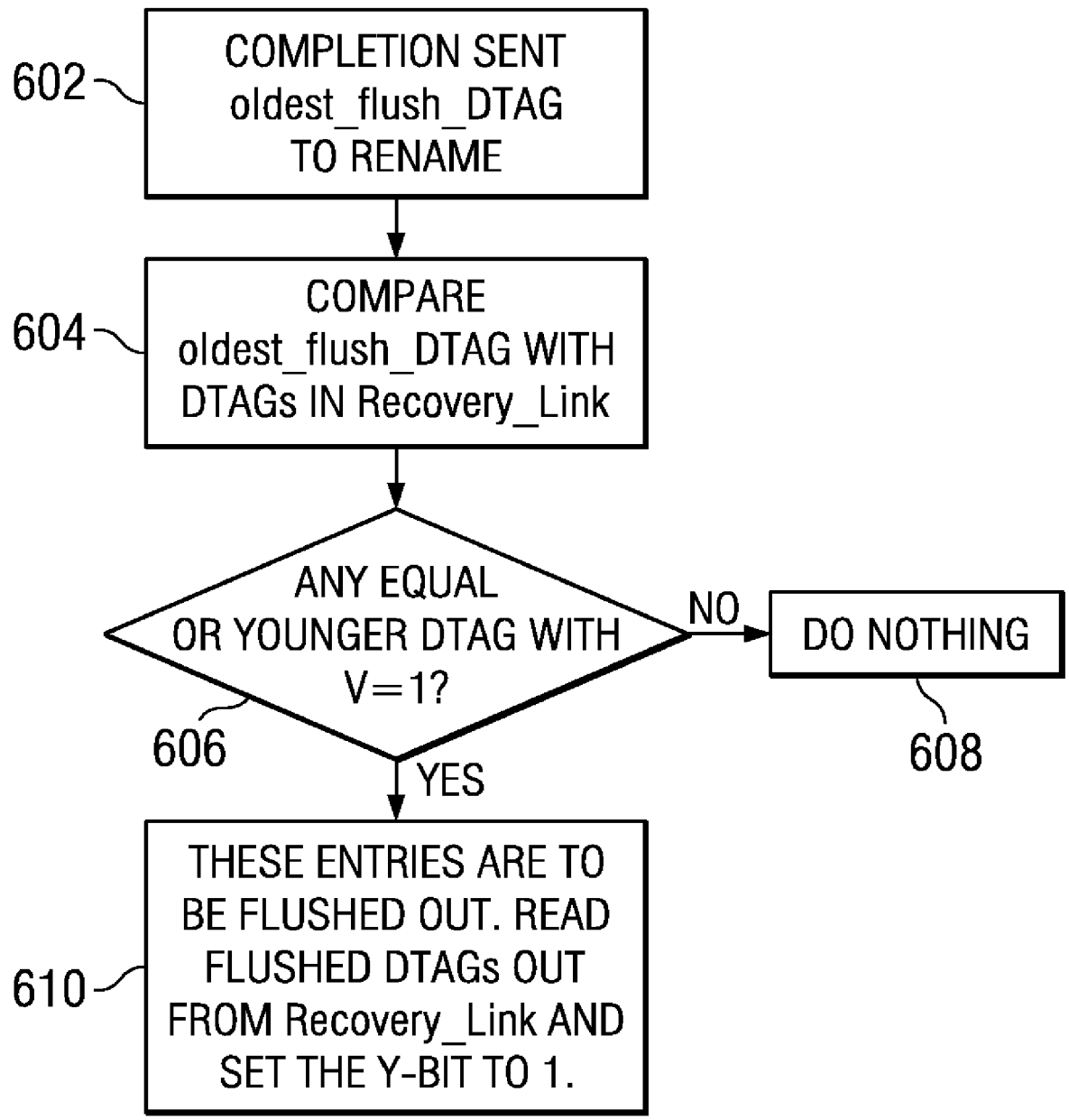
FIG. 6 is a flowchart of a process illustrating how an instruction flush is handled in accordance with the illustrative embodiments.

FIG. 6 is a flowchart of a process illustrating how an instruction flush is handled in accordance with the illustrative embodiments. The process begins when the completion logic sends an oldest_flush_DTAG to the rename stage (step 602), and compares the oldest_flush_DTAG with all of the DTAGs in the recovery_link array (step 604). A determination is made as to whether there are any DTAGs with a V-bit 418 set to 1 in the recovery_link that are equal or younger than the oldest_flush_DTAG (step 606). If no such a DTAG is found in the recovery_link array ('no' output of step 606), no action is taken (step 608), and the process terminates thereafter. If such a DTAG is found in the recovery_link array ('yes' output of step 606), these DTAG entries are flushed out by reading these flushed DTAGs out from the recovery_link array and setting the Y-bit to 1 (step 610), with the process terminating thereafter.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be (1) a computer-readable storage medium including an electronic, magnetic, optical, electromagnetic, infrared, or semiconductor system (or apparatus or device) or (2) a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer-implemented method for processing a number of threads in a data processing system, the computer-implemented method comprising:

responsive to changing an execution mode of a processor to operate in in-order thread execution mode, switching a physical register in the data processing system to operate as part of an architected facility to form a switched physical register;

issuing an instruction to an execution unit, wherein the issued instruction comprises a thread bit;

examining the thread bit to determine if the instruction accesses a logical register of the architected facility or the switched physical register of the architected facility;

executing the instruction;

writing results of the executed instruction to the architected facility;

responsive to changing the execution mode of the processor to operate in out-of-order thread execution mode, switching the switched physical register in the data processing system from operating as part of the architected facility back to operating as the physical register;

issuing a second instruction to an execution unit;

executing the second instruction; and writing results of the executed second instruction to the physical register;

wherein the physical register is switched from being an entry in a register rename buffer when the processor is operating in the out-of-order thread execution mode to being the switched physical register when the processor is operating in the in-order thread execution mode in order to augment logical registers in the architected facility when the processor is operating in the in-order thread execution mode; and wherein the out-of-order thread execution mode for the processor is a mode where the processor executes at least one instruction of a given thread out of order with respect to other instructions of the given thread, and the in-order thread execution mode for the processor is a mode where the processor executes all instructions of the given thread in order.

2. The computer-implemented method of claim 1, wherein changing between the out-of-order thread execution mode and the in-order thread execution mode is based on a number of threads being simultaneously executed by the data processing system.

3. The computer-implemented method of claim 1, wherein the physical register provides temporary storage for the data processing system.

4. The computer-implemented method of claim 1, wherein the architected facility is a general purpose register file.

5. The computer-implemented method of claim 1, wherein the architected facility is a floating point register file.

6. The computer-implemented method of claim 1, wherein the switched physical register provides permanent storage for the data processing system.

7. A computer program product for processing a number of threads in a data processing system, the computer program product comprising:

a non-transitory computer readable storage medium having computer usable program code tangibly embodied thereon, the computer usable program code comprising:

computer usable program code for switching, in response to changing an execution mode of a processor to operate in in-order thread execution mode, a physical register in the data processing system to operate as part of an architected facility to form a switched physical register;

computer usable program code for issuing an instruction to an execution unit, wherein the issued instruction comprises a thread bit;

computer usable program code for examining the thread bit to determine if the instruction accesses a logical register of the architected facility or the switched physical register of the architected facility;

computer usable program code for executing the instruction;

computer usable program code for writing results of the executed instruction to the architected facility;

computer usable program code for switching the switched physical register in the data processing system from operating as a part of the architected facility back to operating as the physical register in response to changing the execution mode of the processor to operate in out-of-order thread execution mode;

computer usable program code for issuing a second instruction to an execution unit;

computer usable program code for executing the second instruction; and computer usable program code for writing results of the executed second instruction to the physical register;

wherein the physical register is switched from being an entry in a register rename buffer when the processor is operating in the out-of-order thread execution mode to being the switched physical register when the processor is operating in the in-order thread execution mode in order to augment logical registers in the architected facility when the processor is operating in the in-order thread execution mode; and wherein the out-of-order thread execution mode for the processor is a mode where the processor executes at least one instruction of a given thread out of order with respect to other instructions of the given thread, and the in-order thread execution mode for the processor is a mode where the processor executes all instructions of the given thread in order.

8. The computer program product of claim 7, wherein changing between the out-of-order thread execution mode and the in-order thread execution mode is based on a number of threads being simultaneously executed by the data processing system.

9. The computer program product of claim 7, wherein the physical register provides temporary storage for the data processing system.

10. The computer program product of claim 7, wherein the architected facility is a general purpose register file.

11. The computer program product of claim 7, wherein the architected facility is a floating point register file.

12. The computer program product of claim 7, wherein the switched physical register provides permanent storage for the data processing system.

13. A data processing system for processing a number of threads, the data processing system comprising:

a bus;

a hardware storage device connected to the bus, wherein the hardware storage device contains computer usable code;

at least one managed hardware device connected to the bus;

a hardware communications unit connected to the bus; and a hardware processing unit connected to the bus, wherein the hardware processing unit executes the computer usable code to:

switch, in response to changing an execution mode of a processor to operate in in-order thread execution mode, a physical register in the data processing system to operate as part of an architected facility to form a switched physical register;

issue an instruction to an execution unit, wherein the issued instruction comprises a thread bit;

examine the thread bit to determine if the instruction accesses a logical register of the architected facility or the switched physical register of the architected facility;

execute the instruction;

write results of the executed instruction to the architected facility;

switch the switched physical register in the data processing system from operating as a part of the architected facility back to operating as the physical register in response to changing the execution mode of the processor to operate in out-of-order thread execution mode;

issue a second instruction to an execution unit;

execute the second instruction; and write results of the executed second instruction to the physical register, wherein the physical register is switched from being an entry in a register rename buffer when the processor is operating in the out-of-order thread execution mode to being the switched physical register when the processor is operating in the in-order thread execution mode in order to augment logical registers in the architected facility when the processor is operating in the in-order thread execution mode, and wherein the out-of-order thread execution mode for the processor is a mode where the processor executes at least one instruction of a given thread out of order with respect to other instructions of the given thread, and the in-order thread execution mode for the processor is a mode where the processor executes all instructions of the given thread in order.

14. The data processing system of claim 13, wherein changing between the out-of-order thread execution mode and the in-order thread execution mode is based on a number of threads being simultaneously executed by the data processing system.

15. The data processing system of claim 13, wherein the architected facility is one of a general purpose register or a floating point register file.

* * * * *